(12) United States Patent
Geiger

(10) Patent No.: US 7,484,747 B2
(45) Date of Patent: Feb. 3, 2009

(54) PNEUMATIC SUSPENSION SYSTEM FOR A VEHICLE

(75) Inventor: Hartmut Geiger, Garbsen (DE)

(73) Assignee: WABCO GmbH, Hannover (DE)

(*) Notice: Subject to any disclaimer, the term of this patent is extended or adjusted under 35 U.S.C. 154(b) by 372 days.

(21) Appl. No.: 10/525,777

(22) PCT Filed: Aug. 27, 2003

(86) PCT No.: PCT/EP03/09462

§ 371 (c)(1),
(2), (4) Date: Aug. 15, 2005

(87) PCT Pub. No.: WO2004/024475

PCT Pub. Date: Mar. 25, 2004

(65) Prior Publication Data

US 2006/0043691 A1    Mar. 2, 2006

(30) Foreign Application Priority Data

Sep. 2, 2002   (DE) ................................ 102 40 357

(51) Int. Cl.
  *B60G 9/04* (2006.01)
(52) U.S. Cl. .................. 280/124.157; 280/124.158; 280/124.159; 280/124.16; 280/124.161
(58) Field of Classification Search .............. 280/5.514, 280/124.157, 124.158, 124.159, 124.16, 280/124.161; 267/64.19, 64.28
See application file for complete search history.

(56) References Cited

U.S. PATENT DOCUMENTS

| | | | |
|---|---|---|---|
| 4,588,895 A * | 5/1986 | Kurbitz ...................... 250/551 |
| 4,799,707 A | 1/1989 | Buma et al. |
| 4,881,753 A * | 11/1989 | Shima et al. ............. 280/6.157 |
| 5,083,275 A * | 1/1992 | Kawagoe et al. .............. 701/37 |
| 5,159,554 A * | 10/1992 | Buma et al. .................... 701/37 |
| 5,711,150 A | 1/1998 | Oshita et al. |
| 6,089,831 A * | 7/2000 | Bruehmann et al. ......... 417/282 |
| 6,098,967 A | 8/2000 | Folchert |
| 6,116,586 A | 9/2000 | Westerkamp et al. |
| 6,332,623 B1 | 12/2001 | Behmenburg et al. |
| 6,354,617 B1 * | 3/2002 | Behmenburg et al. . 280/124.157 |
| 6,685,174 B2 | 2/2004 | Behmenburg et al. |
| 6,726,189 B2 * | 4/2004 | Folchert et al. .......... 267/64.16 |
| 6,824,145 B2 * | 11/2004 | Behmenburg ............ 280/6.157 |
| 7,032,895 B2 * | 4/2006 | Folchert ................... 267/64.28 |
| 7,079,166 B1 * | 7/2006 | Hong ......................... 715/777 |

(Continued)

FOREIGN PATENT DOCUMENTS

DE    40 04 482 A1    8/1991

(Continued)

*Primary Examiner*—Toan C To
(74) *Attorney, Agent, or Firm*—Kramer Levin Naftalis & Frankel LLP

(57) ABSTRACT

A pneumatic suspension system for a vehicle includes pneumatic bellows connectable by means of a valve arrangement to at least one other component of the pneumatic suspension system in order to selectively increase or decrease the amount of compressed air therein. The other component contains at least one volume. Undesirable changes in the amount of compressed air inside the pneumatic bellows arising as a result of pressure compensation are avoided or reduced to a non-disruptive level by a return valve between the valve arrangement and the volume which prevents compressed air from flowing between the pneumatic bellows and the volume in one direction of flow.

18 Claims, 10 Drawing Sheets

U.S. PATENT DOCUMENTS

| | | | |
|---|---|---|---|
| 7,331,592 B2 * | 2/2008 | Heer | 280/124.16 |
| 2002/0079626 A1 | 6/2002 | Grotendorst et al. | |
| 2004/0188970 A1 * | 9/2004 | Matern et al. | 280/124.16 |
| 2006/0049606 A1 * | 3/2006 | Geiger et al. | 280/124.157 |

FOREIGN PATENT DOCUMENTS

| | | |
|---|---|---|
| DE | 197 13 313 A1 | 10/1998 |
| DE | 199 59 556 C1 | 12/2000 |
| DE | 102 03 075 A1 | 8/2002 |
| EP | 0 343 391 A2 | 11/1989 |
| JP | 2002/087040 | 3/2002 |

* cited by examiner

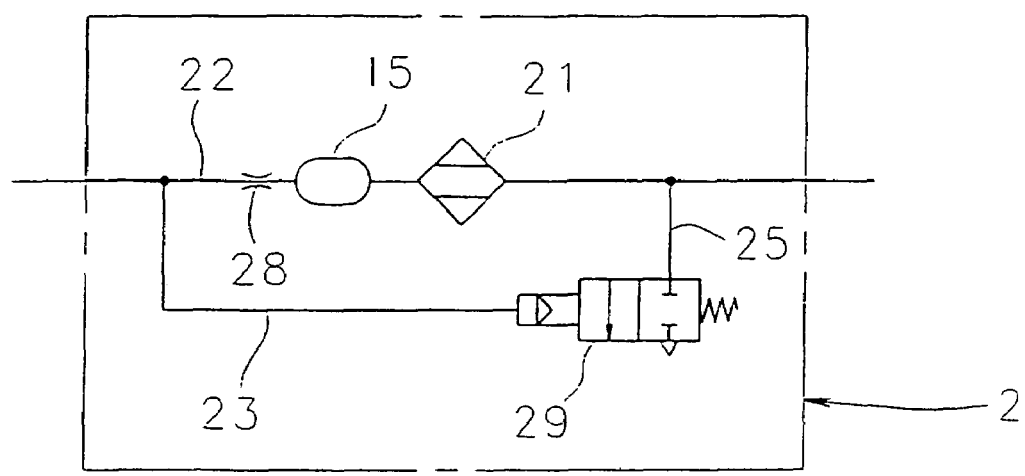
Fig 9
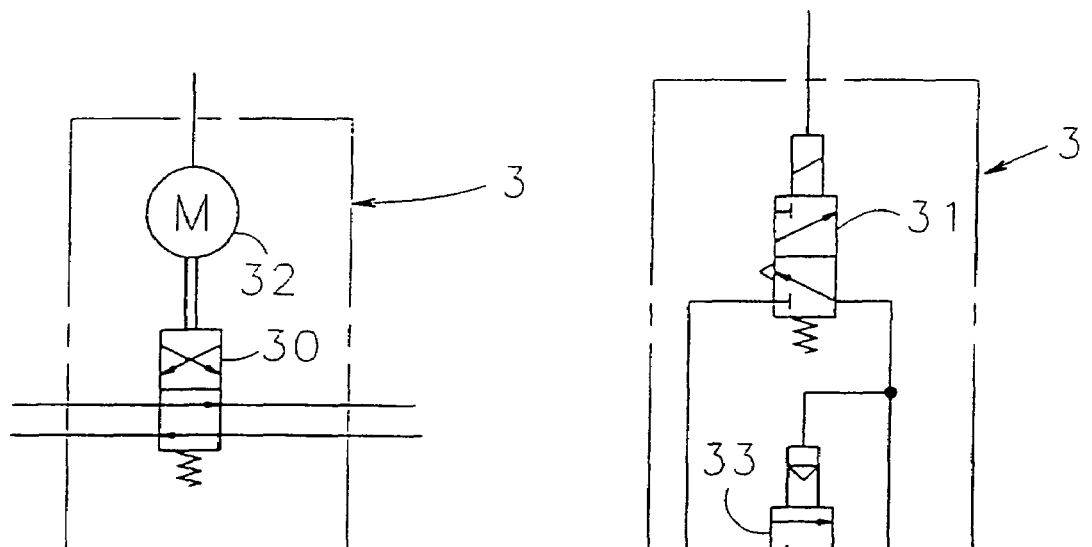
Fig. 10
Fig. 11

US 7,484,747 B2

PNEUMATIC SUSPENSION SYSTEM FOR A VEHICLE

BACKGROUND OF THE INVENTION

The present invention relates to an air-suspension system for a vehicle, especially a closed or partly closed system.

An air-suspension system of the general type under consideration is described in DE 199 59 556 C1.

In such conventional air-suspension systems there is provided at least one air-suspension bellows which, via a valve arrangement, can be placed in communication with at least one further component of the air-suspension system in order to selectively increase or decrease the compressed-air quantity contained therein. In the known air-suspension system described in DE 199 59 556 C1, a compressed-air delivery device such as a compressor is used as such a further component, which serves, on the one hand, to pump air as needed from a compressed-air accumulator into the air-suspension bellows, and, on the other hand, to pump air as needed from the air-suspension bellows back into the compressed-air accumulator. To establish the necessary compressed-air communications, the valve arrangement is provided, which permits changeover between the two compressed-air delivery directions.

In this process, it may occur that—if an increase of the compressed-air quantity in the air-suspension bellows is to be achieved—the air pressure in those further components of the air-suspension system with which the air-suspension bellows is in communication via the valve arrangement is lower than in the air-suspension bellows. In this situation, an undesired decrease of the compressed-air quantity in the air-suspension bellows takes place at first, until pressure equality is established. In the case where a decrease of the compressed-air quantity in the air-suspension bellows is to be achieved, a higher air pressure may be present in a further component of the air-suspension system than in the air-suspension bellows. This leads, at first, to an undesired increase of the compressed-air quantity in the air-suspension bellows. Depending on the size of the volumes present in further components of the air-suspension system, such behavior may prove to be disruptive for the function of the air-suspension system, since changes in the compressed-air quantity in the air-suspension bellows lead to changes in the level height of the vehicle body.

SUMMARY OF THE INVENTION

Generally speaking, in accordance with the present invention, an improved vehicle air-suspension is provided in which the undesired changes of the compressed-air quantity in the air suspension bellows are avoided or at least reduced to an extent that they are not disruptive.

One advantage of the present invention is that it is possible to prevent unwanted changes in level of the vehicle body in the "wrong" direction, such changes being considered to be disruptive and resulting in a visual impression that is not acceptable.

The present invention has the further advantage that it can be implemented very cost-effectively by the selective use of one or two check valves, since check valves are of relatively simple construction and are therefore inexpensive. Depending on need, that is, on the volumes present in the air-suspension system, a check valve can be disposed on the inlet side of the compressed-air delivery device and/or on the outlet side of the compressed-air delivery device or on the outlet side of an air-discharge/dryer device mounted downstream from the compressed-air delivery device. The advantageous use of two check valves will be described in greater detail hereinafter in connection with practical examples.

A further advantage of the present invention is that it can be used in a large number of different versions of the air-suspension system, as will be described in greater detail hereinafter in connection with practical examples.

According to one embodiment of the present invention, the compressed air flows through the air-discharge/dryer device in the same direction in all operating conditions of the air-suspension system. This has the advantage that, because of the uniform flow direction, one check valve can be disposed between the air-discharge/dryer device and the valve arrangement. As a result, the volume of the air dryer, especially of the air-dryer cartridge, is also isolated by the check valve from the air-suspension bellows.

Still other objects and advantages of the present invention will in part be obvious and will in part be apparent from the specification.

The present invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

The invention will be described in more detail hereinafter and further advantages will be pointed out on the basis of practical examples with reference to the accompanying drawings, wherein:

FIGS. 6 to 9 show further embodiments of an air-discharge/dryer device for use in the inventive air-suspension system according to FIG. 1;

FIGS. 10 to 12 show further embodiments of a changeover-valve device for use in the inventive air-suspension system according to FIG. 1;

In the figures, like reference symbols are used for parts that correspond to one another.

DETAILED DESCRIPTION OF THE PREFERRED EMBODIMENTS

Figure 1:
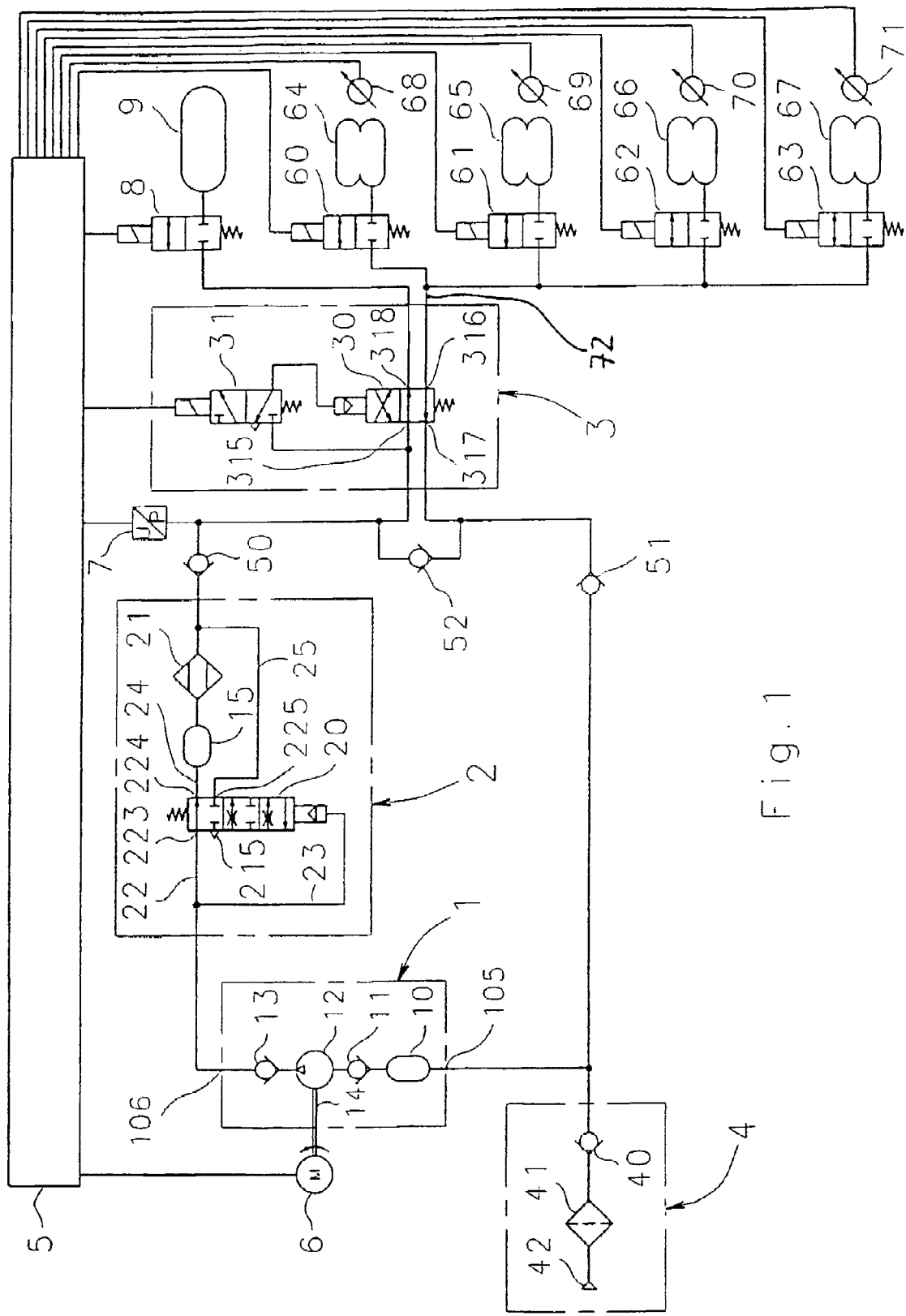
FIG. 1 is a schematic diagram of a partly closed air-suspension system according to one embodiment of the present invention.

The function of an air-suspension system for a vehicle is to adjust and control, via leveling means, the level height of the vehicle body relative to the vehicle axles and thus indirectly relative to the roadway. For this purpose such a leveling means is preferably disposed on each wheel of a vehicle, and air-suspension bellows are preferably used as leveling means. By filling or venting the individual air-suspension bellows, any desired level heights of the vehicle body can be adjusted within an adjustment range provided for the purpose. Such air-suspension systems are preferably operated with compressed air as the pressurized medium.

In air-suspension systems constructed and arranged as open systems, compressed air is sucked in as necessary from the surroundings, or in other words from the atmosphere, and pumped into the air-suspension bellows or into a compressed-air accumulator, or in other words a reservoir tank. The compressed-air accumulator, however, is not absolutely necessary and, depending on requirements, may even be left out. During venting of the air-suspension bellows, the compressed-air is always discharged directly to the atmosphere. Return delivery of compressed air from the air-suspension bellows into the compressed-air accumulator is not provided in such cases. The open system is of relatively simple design, and operates with relatively few components. Such air-suspension systems have been used for many years in commercial vehicles such as trucks and buses and also in passenger cars.

In contrast, a closed system always contains a compressed-air accumulator, which—at least theoretically—is filled one time with compressed air, for example during manufacture of the air-suspension system. The closed system has no kind of communication with the atmosphere—at least theoretically. During operation as designed, the compressed air is delivered forward and back as needed by a compressed-air delivery device, from the compressed-air accumulator to the air-suspension bellows or from the air-suspension bellows to the compressed-air accumulator. Compared with an open system, this has the advantage that the change of pressure level to be established during air delivery by the compressed-air delivery device, such as a compressor, is usually smaller, since the pressure of the compressed air to be delivered is usually at a certain level, which is relatively high compared with atmospheric pressure. As a result, the energy consumption of such a closed system is smaller. In addition, the compressed-air delivery device can be designed for smaller power consumption. Other advantages are that the compressed-air delivery device can be operated with a shorter "On" time and that it develops relatively little internal heat.

In practice, such closed systems are not able to function continuously because they lose compressed air, for example due to leaks in the air-suspension bellows which are made of elastic material. It has therefore been proposed that partly closed systems be used in which a compressed-air accumulator is also provided and in which, as long as sufficient compressed air is present in the system, the compressed air is delivered forward and back between the compressed-air accumulator and the air-suspension bellows, just as in the closed system. In addition, communication with the atmosphere is provided, so that the system can be filled with compressed air, for example in the event of pressure losses or large temperature fluctuations, and air can be sucked in from the atmosphere. To avoid overpressure conditions, it is additionally standard practice to provide an air-discharge device for venting excess pressure to the atmosphere.

In such a partly closed system, therefore, some air exchange, albeit of limited extent, takes place with the atmosphere. As a result, the partly closed system not only is practical but also it can largely exploit the advantages of a closed system. Such an air-suspension system designed as a partly closed system is preferably provided with the following functional units:

a compressed-air delivery device, which preferably is designed as a compressor and, for example, can be driven by an electric motor,
a compressed-air accumulator for storage of compressed air at a specified pressure level,
air-suspension bellows,
an air-intake device,
an air-discharge device, and
an air-dryer device.

The foregoing functional units can be placed in communication with one another via actuatable valve devices, especially electrically actuatable valve devices, in such a way that "increase air quantity", "hold air quantity" and "decrease air quantity" functions can be activated for the air-suspension bellows. A desired level height can then be adjusted for the duration of an "increase air quantity" or "decrease air quantity" process. Such an air-suspension system is preferably controlled by an electronic control unit.

FIG. 1 illustrates a partly closed air-suspension system according to a preferred embodiment of the present invention.

The compressed-air delivery device is illustrated in block (1), which is outlined in broken lines. The air-discharge device in combination with the air-dryer device, referred to hereinafter as air-discharge/dryer device (2), is illustrated in block (2), which is outlined in broken lines. The air-intake device is illustrated in block (4), which is outlined by broken lines. The compressed-air accumulator (9) as well as the air-suspension bellows (64, 65, 66, 67) are also illustrated. In addition, displacement sensors (68, 69, 70, 71) are allocated to air-suspension bellows (64, 65, 66, 67). Via electrical lines, displacement sensors (68, 69, 70, 71) respectively transmit, to an electronic control unit (5), an electrical signal representative of the level height of the vehicle body in the region of that air-suspension bellows to which they are allocated.

In a further block (3), which is also outlined in broken lines, there is illustrated a changeover-valve device which is used for control of the compressed-air flow direction during delivery of compressed air forward or back between compressed-air accumulator (9) and air-suspension bellows (64, 65, 66, 67). By switching changeover-valve device (3) to a first valve position, compressed-air accumulator (9), acting as a compressed-air source, can be placed in communication alternately with compressed-air bellows (64, 65, 66, 67). In a second valve position of changeover valve (3), air-suspension bellows (64, 65, 66, 67), acting as the compressed-air source, can be placed in communication with compressed-air accumulator (9). Accordingly, the "increase air quantity" function can be activated relative to air-suspension bellows (64, 65, 66, 67) in the first valve position, while the "decrease air quantity" function can be activated in the second valve position.

Via a shutoff valve (8), designed as an electromagnetically actuatable 2/2-way valve and also referred to hereinafter as the accumulator valve, compressed-air accumulator (9) illustrated in FIG. 1 is placed in communication with a port (318) of changeover-valve device (3). Via respective shutoff valves (60, 61, 62, 63) disposed upstream from each air-suspension bellows and also referred to hereinafter as bellows valves, as well as via a common compressed-air line (72), air-suspension bellows (64, 65, 66, 67) are placed in communication with a further port (316) of changeover-valve device (3). Preferably, bellows valves (60, 61, 62, 63) are also designed as electromagnetically actuatable 2/2-way valves. Check valves (51, 52) connected via their inlet sides are provided at a further port (317) of changeover-valve device (3). On the outlet side, check valve (51) is in communication with air intake device (4) as well as with a suction port (105) of compressed-air delivery device (1). An outlet port (106) of compressed-air delivery device (1) is in communication with an air inlet of air-discharge/dryer device (2). A check valve (50) is disposed at one outlet of air-discharge/dryer device (2). Check valves (50, 52) are in communication via their outlet sides with a further port (315) of changeover-valve device (3).

In the air-suspension system configuration illustrated in FIG. 1, there is disposed, at the outlet side of check valve (50), a pressure sensor (7) that measures the pressure present there and transmits an electrical signal representative of that pressure to electronic control unit (5). If necessary, pressure sensor (7) can be provided as an option or can even be omitted to achieve more favorable manufacturing costs for the air-suspension system, as will be explained in more detail hereinafter.

There is also provided an electric motor (6) that can be turned on via an electrical signal from electronic control unit (5). Via a drive shaft (14), electric motor (6) drives a piston machine (12) provided in compressed-air delivery device (1).

Electronic control unit (5) is preferably used for control of all functions of the air-suspension system. For this purpose, control unit (5) is connected via electrical lines to an electric actuating device of changeover-valve device (3), to shutoff valves (8, 60, 61, 62, 63), to optional pressure sensor (7), to displacement sensors (68, 69, 70, 71) and to electric motor (6).

Compressed-air delivery device (1) is provided with the functional units explained in greater detail hereinafter. A piston machine (12) is used to deliver air from suction port (105) to outlet port (106) of compressed-air delivery device (1). Piston machine (12) can be designed as any suitable conventional piston compressor, even, for example, a rocking-piston compressor. As mentioned, piston machine (12) can be driven via a drive shaft (14). On the intake side of compressed-air delivery device (1) there is disposed a suction valve (11) designed as a check valve. On the outlet side of compressed-air delivery device (1) there is disposed an outlet valve (13), also designed as a check valve. The delivery direction of compressed-air delivery device (1) is determined by check valves (11, 13).

Hereinafter, not only the suction valve (11) but also all parts of the air-suspension system in direct or indirect pneumatic communication with suction port (105), from suction valve (11) to port (317) of changeover-valve device (3), will be regarded as allocated to the intake side of compressed-air delivery device (1). In the practical example according to FIG. 1, these are parts (10, 11, 40, 41, 42, 51, 105, 317) as well as the inlet of check valve (52). Also, hereinafter, not only the outlet valve (13) but also all parts of the air-suspension system in direct or indirect pneumatic communication with outlet port (106), from outlet valve (13) to port (315) of changeover-valve device (3), will be regarded as allocated to the outlet side of compressed-air delivery device (1). In the practical example according to FIG. 1, these are parts (2, 7, 13, 50, 106, 315) as well as the outlet of check valve (52).

As depicted in FIG. 1, the volume (10) illustrated with an accumulator symbol on the intake side of compressed-air delivery device (1) symbolically represents all volumes present on the intake side of compressed-air delivery device (1), such as the volume of the crankcase of piston machine (12) or even the compressed-air lines connected to the intake side of compressed-air delivery device (1). Volumes present on the outlet side of compressed-air delivery device (1) are represented collectively by a volume (15), which will be described in more detail hereinafter, and which is illustrated in air-discharge/dryer device (2) in FIG. 1.

Figure 2:
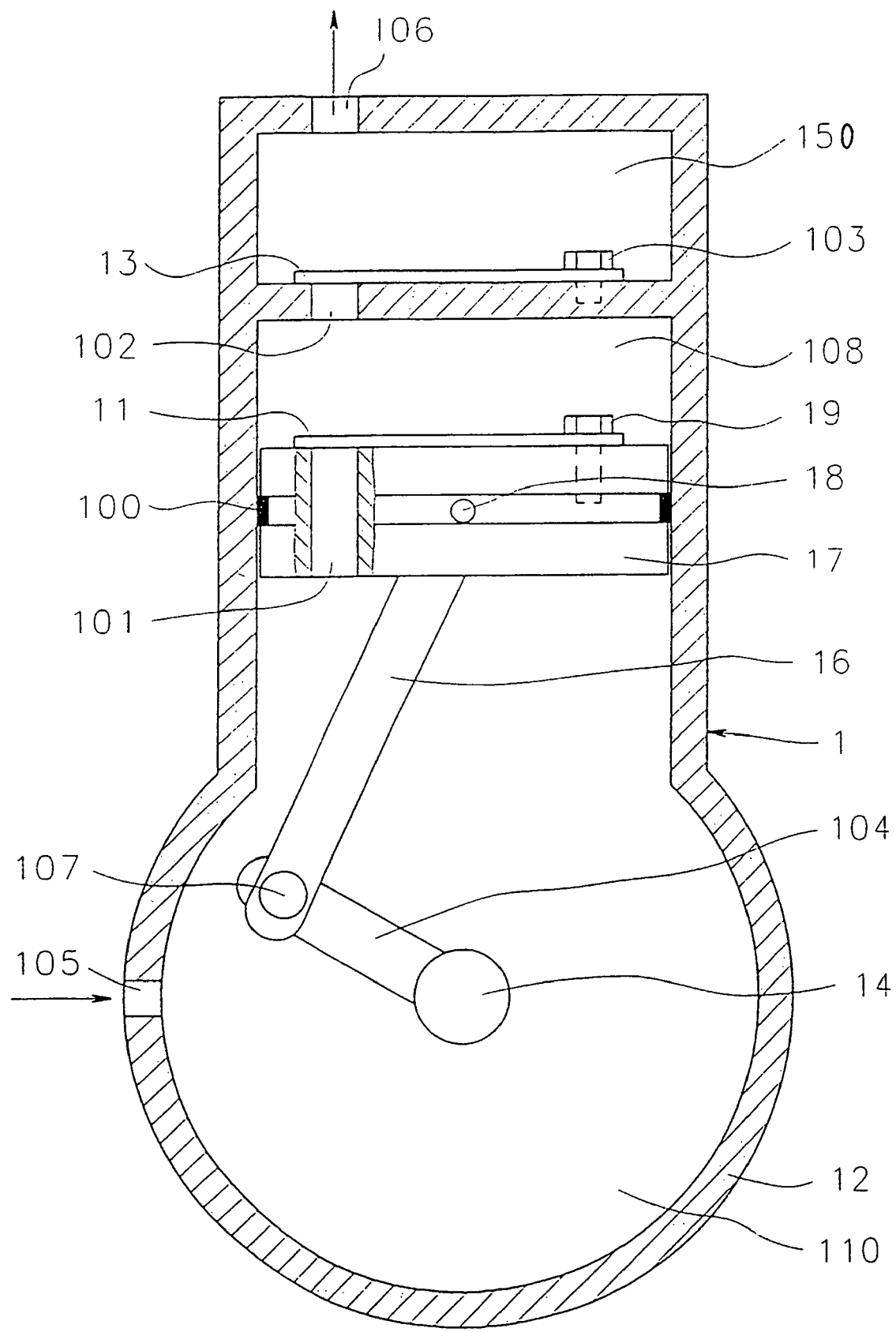
FIG. 2 shows a compressed-air delivery device for use in the inventive air-suspension system according to FIG. 1.

A practical example of such a compressed-air delivery device (1) is illustrated in FIG. 2 in the form of a piston compressor. The piston machine (12) is provided inside its case with a drive shaft (14), which is mechanically connected to a piston (17) via a connecting member (104), a revolute joint (107), a connecting rod (16) and a further revolute joint (18). In response to rotation of drive shaft (14), piston (17) executes an upward and downward movement. Piston (17) is equipped with a circumferential seal (100), which seals a pressure space (108) provided above the piston from a suction space (110) provided in the crankcase of compressor (12). On the top end of piston (17) there is disposed suction valve (11), which for design reasons is preferably formed as a thin plate, which is fastened to piston (17), for example by means of a screw (19). During upward movement of piston (17), suction valve (11) functions to seal pressure space (108) from an intake opening (101) that passes through piston (17).

Above pressure space (108) there is provided an outlet space (150). In outlet space (150) there is provided outlet valve (13), which for design reasons is preferably formed as a thin plate, which is fastened, for example by means of a screw (103), to the underside of outlet space (150). During downward movement of piston (17), outlet valve (13) seals outlet space (150) from an outlet duct (102) as well as from pressure space (108).

During a downward stroke of piston (17), the air sucked in via suction port (105) flows through intake duct (101) and valve (11), which is open at the time, into pressure space (108), which at the time is shut off from outlet space (150) by means of valve (13). During an upward stroke of piston (17), suction valve (11) closes, whereby the air present in pressure space (108) is pressed through outlet duct (102) and outlet valve (13), which is open at the time, into outlet space (150). From outlet space (150), the compressed air present there can then flow via outlet port (106) into downstream air-discharge/dryer device (2).

According to FIG. 1, air-discharge/dryer device (2) is provided in an advantageous configuration with a compressed-air-controlled 4/3-way valve (20) as well as with an air dryer (21). Between 4/3-way valve (20) and air dryer (21) there is illustrated volume (15), represented by an accumulator symbol, which represents the volumes due to air-discharge/dryer device (2), especially due to the air-dryer cartridge. The volumes present on the outlet side of compressed-air delivery device (1) are also included in volume (15).

In the valve position of valve (20) illustrated in FIG. 1, the compressed air discharged by compressed-air delivery device (1) flows via a compressed-air line (22) into valve (20) at a port (223), out of valve (20) at a further port (224) and into a compressed-air line (24), from there through air dryer (21) and from there via check valve (50) to changeover-valve device (3). Via a compressed-air line (25), the outlet side of air dryer (21) is additionally provided with communication back to a further port (225) of valve (20), which is shut off in the valve position illustrated in FIG. 1. A further port (215) of valve (20) is used as the vent port of the air-suspension system; it is in communication with the atmosphere.

Via a compressed-air line (23), port (223) of valve (20), which is in communication with compressed-air delivery device (1), is in communication with a compressed-air-actuated control port of valve (20). When the pressure at the control port rises appropriately, valve (20) can be changed over from the valve position illustrated in FIG. 1 to a second and a third valve position. The connecting duct between ports (223, 224) of valve (20) still has relatively large passage cross section in the first valve position, but in the second valve position it is changed over to a throttling position with greatly reduced passage cross section. Compressed-air line (25) continues to be shut off in the second valve position.

As the pressure at the control port rises further, the third valve position is finally established. The throttling position with greatly reduced passage cross section is again provided between ports (223, 224) of valve (20). Compressed-air line (25) is then in communication with the compressed-air outlet at port (215), or, in other words, with the atmosphere, and so compressed air can be discharged to the atmosphere. In this context, valve (20) also functions as an overpressure safety valve, or, in other words, as a safeguard against undesirably high pressure values in the air-suspension system, as will also be described in greater detail hereinafter.

Because of the throttling effect of valve (20) in the second and third valve positions, the compressed air expands on its way from compressed-air line (22) to compressed-air line (24), and thus arrives in expanded condition or in other words at a lower pressure level in air dryer (21), after which it can be discharged to the atmosphere when the third valve position of valve (20) is reached. Because of the expansion of the compressed air as a result of the throttling effect, an improved regeneration effect of the dryer granules present in air dryer (21) is achieved. Thus, a relatively good drying effect is achieved with relatively little compressed-air consumption.

In contrast to conventional air-suspension systems, the air-dryer device in the air-suspension system according to embodiments of the present invention described herein is advantageously disposed such that compressed air always flows through it in the same flow direction both in normal operation of the air-suspension system and in regeneration operation, or, in other words, during extraction of moisture from the dryer granules. This has the advantage that air dryer (21) can be mounted permanently at the outlet side of compressed-air delivery device (1). In particular, it can be disposed in relatively close spatial proximity to the compressed-air delivery device, and so air preheated by the compressed-air delivery device can be passed through it in any mode of operation. Because of the spatially compact arrangement next to the compressed-air delivery device, the heated compressed air can reach air dryer (21) with a relatively small temperature drop. Since hot air can absorb the moisture much better than cold air, a further substantial improvement of efficiency of regeneration of the dryer granules can be achieved by this configuration of the invention.

Figure 3:
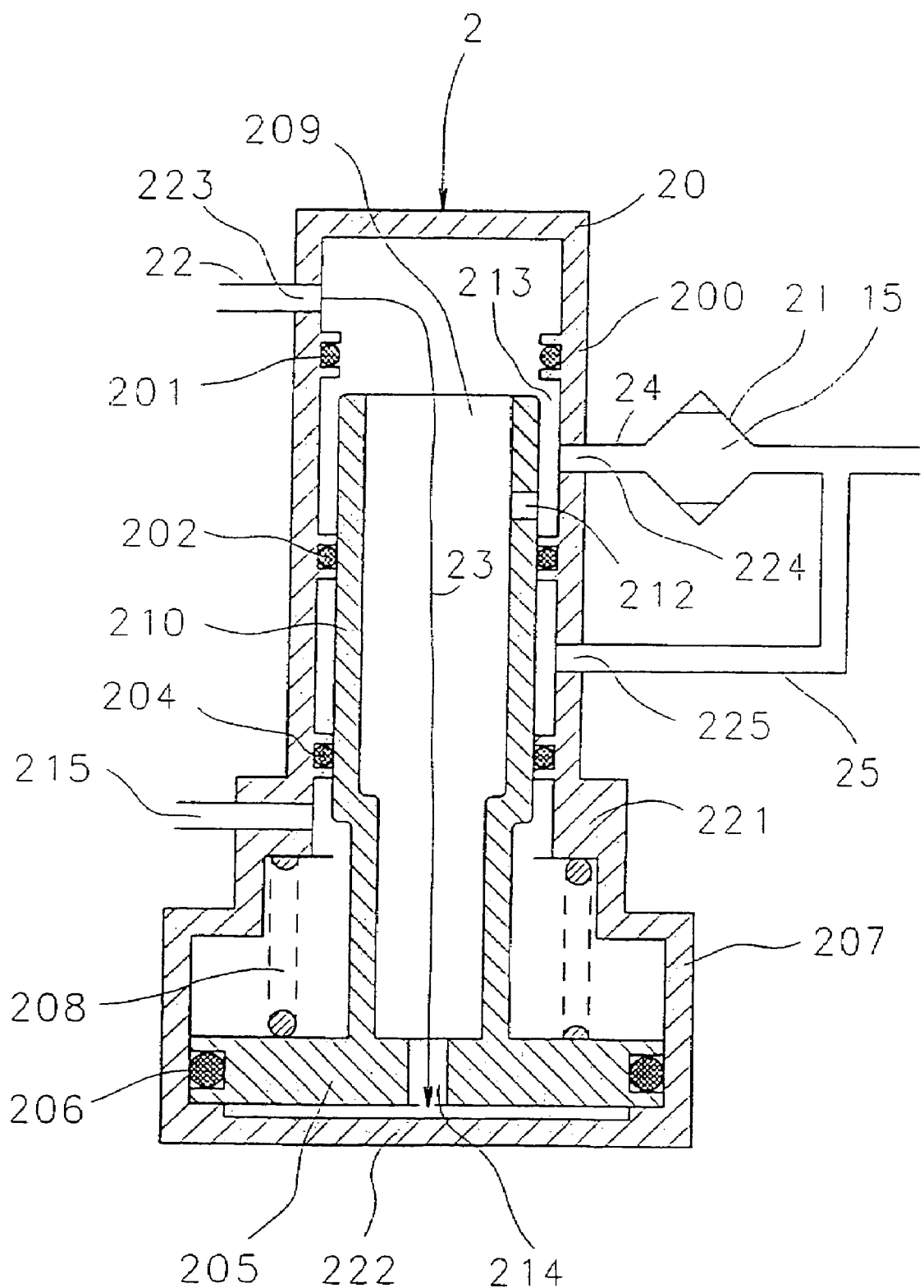
FIG. 3 shows a 4/2-way changeover valve in a first operating position in accordance with an embodiment of the present invention.

FIG. 3 shows air-discharge/dryer device (2) as described hereinabove, with an advantageously designed version of 4/3-way valve (20) in its first valve position. Valve (20) has a housing (200), which in its portion illustrated in the lower region of FIG. 3 is provided with a larger cross section than its other portions. As an example, housing (200) can be of rotationally symmetric construction. Inside housing (200) there is disposed a valve member (209) which is rigidly joined to a piston (205) provided for actuation of valve member (209). Piston (205) is guided in housing portion (207) and sealed in housing portion (207) via a circumferential seal (206). In the depressurized or almost depressurized condition of valve (20) illustrated in FIG. 3, piston (205) is pressed against bottom (222) of housing (200) by a spring (208), which is braced against a pedestal-shaped region (221) of housing (200).

Annular seals (201, 202, 204), which are held in position by grooves disposed in housing (200), are disposed at certain spacings in housing (200). Valve member (209) is provided with a wall (210), which is guided inside seals (201, 202, 204) and can be displaced relative to seals (201, 202, 204) in response to a movement of piston (205). Housing (200) is provided with openings (223, 224, 225) to which the pressure lines (22, 24, 25) mentioned hereinabove are connected. Furthermore, an opening for vent port (215) is provided in the lower region of housing (200).

Wall (210) of valve member (209) is provided on the side facing opening (224) with an opening (212). This opening (212) has relatively small cross section compared with the other flow cross sections of valve (20). As a result, a throttling effect, which is active in the second and third valve position of valve (20), can be achieved during flow of compressed air through opening (212).

In the valve position of valve (20) illustrated in FIG. 3, a compressed-air flow injected via compressed-air line (22) can pass through duct (213) into compressed-air line (24) and from there through air dryer (21) to check valve (50). Flow of compressed air through compressed-air line (25) is prevented by seals (202, 204), or in other words compressed-air line (25) is shut off. According to the flow direction indicated by arrow (23), the compressed air can also propagate through an opening (214) passing through piston (205) into the space bounded by piston (205), housing underside (222) and seal (206).

Figure 4:
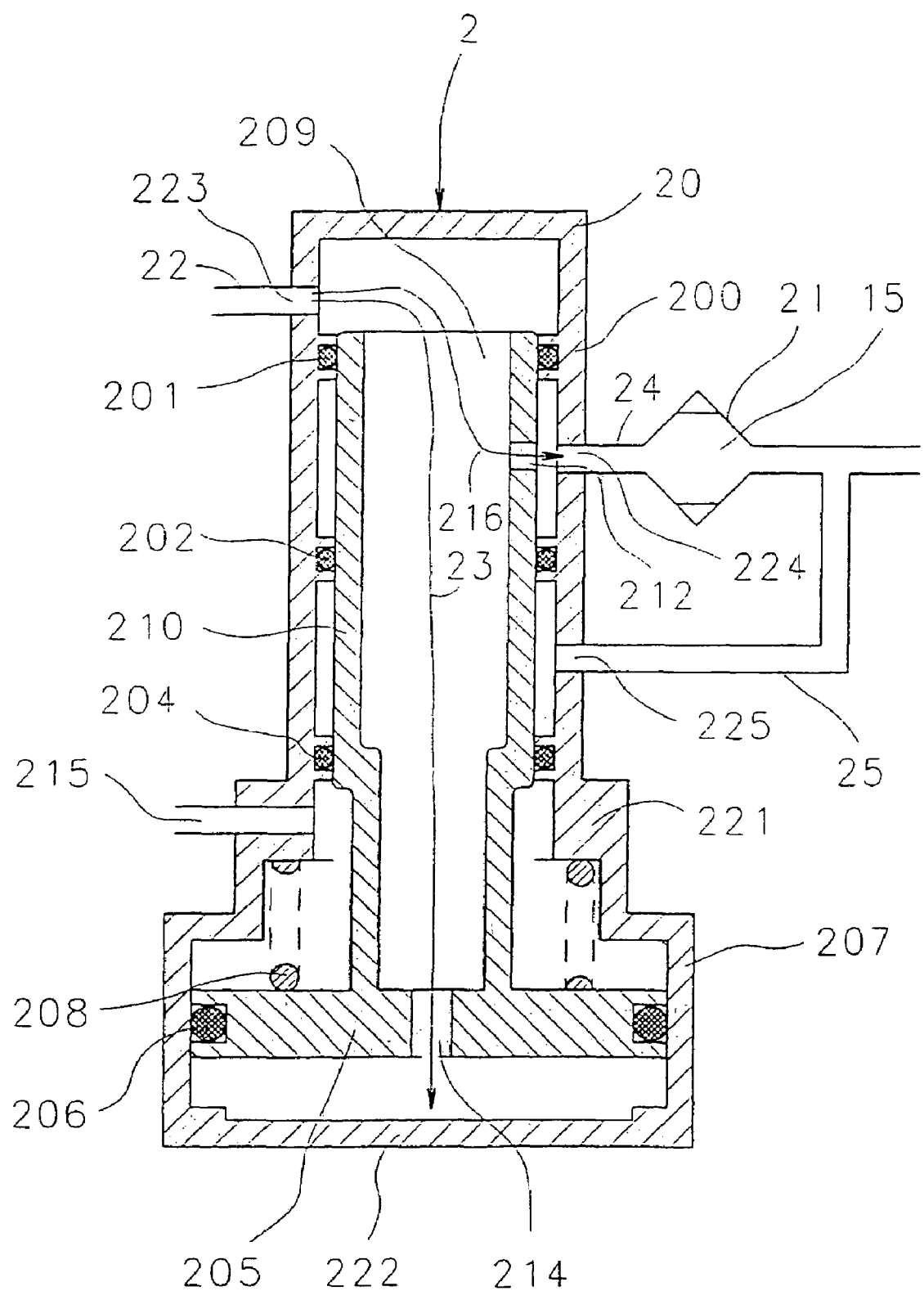
FIG. 4 shows the 4/2-way changeover valve in a second operating position in accordance with an embodiment of the present invention.

When the pressure injected via compressed-air line (22) into valve (20) exceeds a certain minimum value, which also depends on the friction between valve member (209) and seals (201, 202, 204) among other factors, piston (205) begins to move away from housing bottom (222) against the force of spring (208). Such a condition is illustrated in FIG. 4, where the pressure present in valve (20) has already reached a magnitude at which piston (205) has executed such a substantial movement against the force of spring (208) that valve (20) has occupied its second valve position.

In this second valve position, valve member (209) has reached seal (201), whereby duct (213) illustrated in FIG. 3 is shut off. As indicated by arrow (216), a flow of compressed air from compressed-air line (22) to compressed-air line (24) now takes place through opening (212), which acts as a throttling point. As illustrated by arrow (23), compressed-air propagation continues to take place through opening (214), into the space bounded by piston (205), housing bottom (222) and seal (206). Compressed-air line (25) is still shut off.

Figure 5:
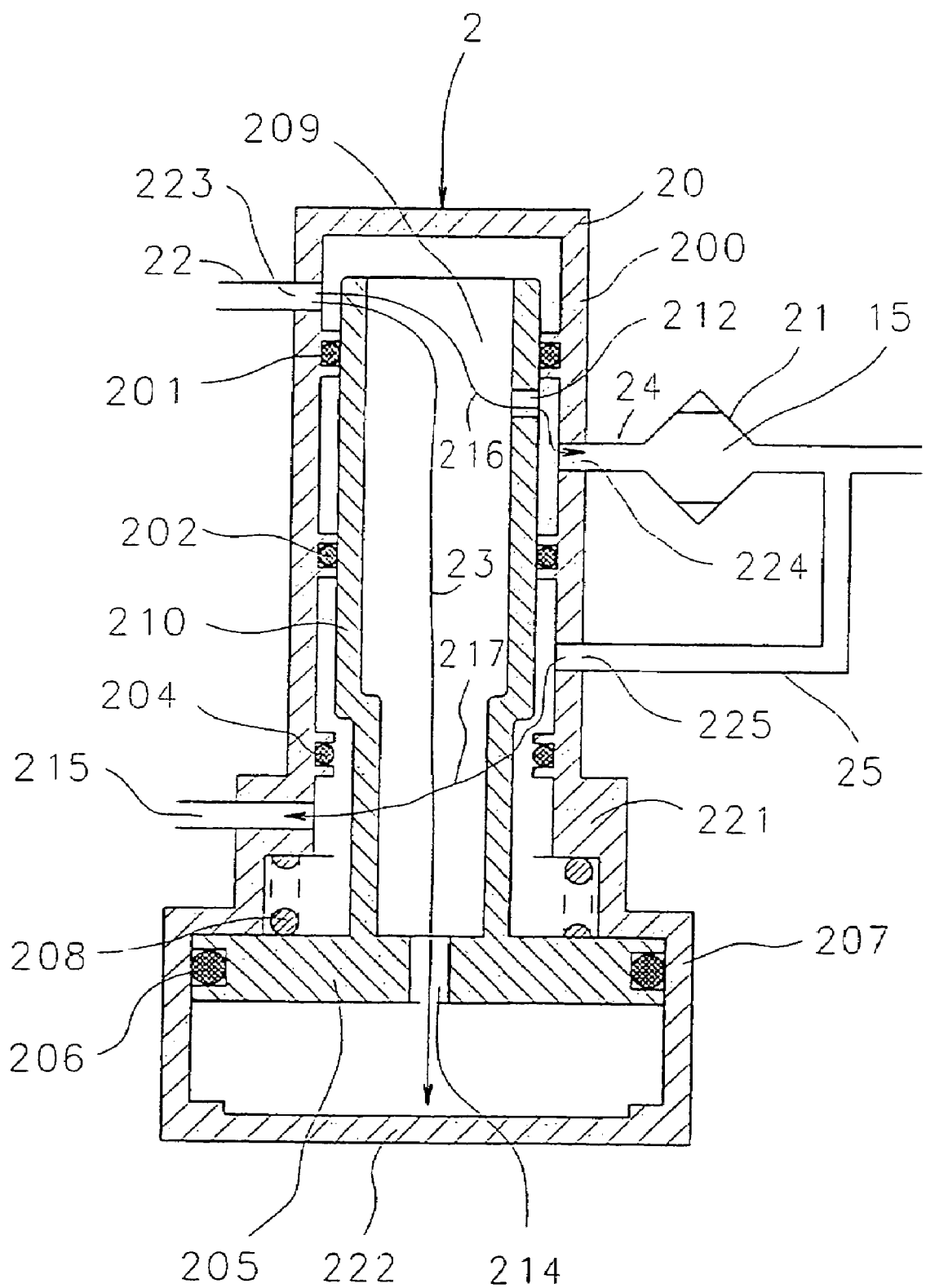
FIG. 5 shows the 4/2-way valve in a third operating position in accordance with an embodiment of the present invention.

As the pressure in valve (20) continues to rise, the third valve position of valve (20) is occupied, as illustrated in FIG. 5. In this valve position, piston (205) bears against the upper side of housing region (207). A compressed-air flow from compressed-air line (22) to compressed-air line (24), as in the second valve position, continues to take place in throttled form through opening (212), as illustrated by arrow (216). The space that had previously been closed by seals (202, 204) and that shuts off compressed-air line (25) is now opened relative to seal (204), and so compressed air can flow out of compressed-air line (25) through opening (215) into the atmosphere, as illustrated by arrow (217).

Figure 6:
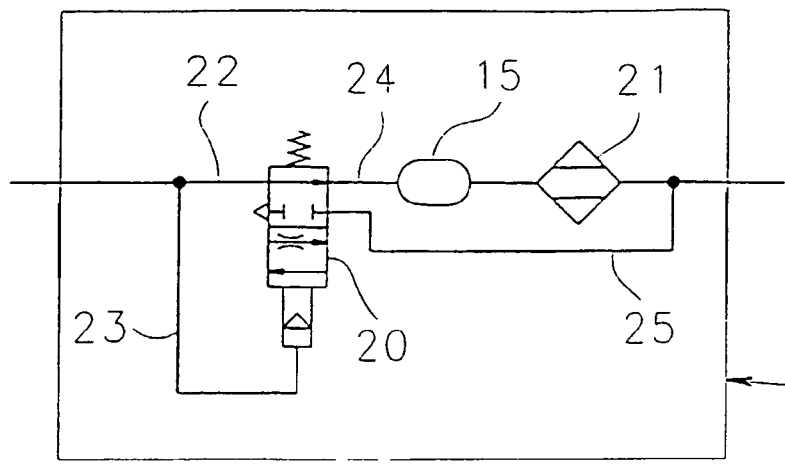

An alternative embodiment of air-discharge/dryer device (2) is illustrated in FIG. 6. Instead of the 4/3-way valve described above, a 4/2-way valve, or in other words a valve of simplified design with only two valve positions, is utilized. As a result, valve (20) can be of simpler design and can be less expensive to manufacture.

Figure 7:
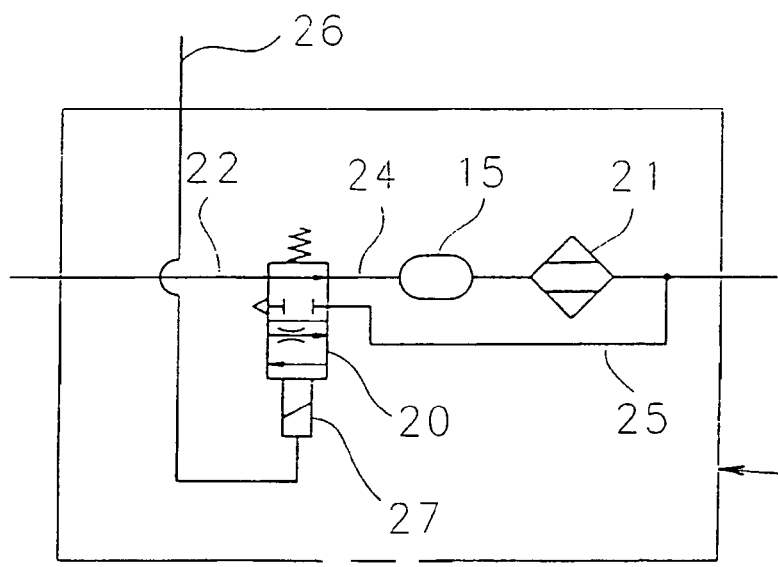

In a further embodiment of the present invention, which is illustrated in FIG. 7, air-discharge/dryer device (2) can also be equipped with an electromagnetically actuatable valve (20). Valve (20) according to FIG. 7 is provided with an electromagnet (27) as actuating element instead of with pressurized-fluid actuating means. Electromagnet (27) can be connected via an electrical line (26) to control unit (5).

Figure 8:
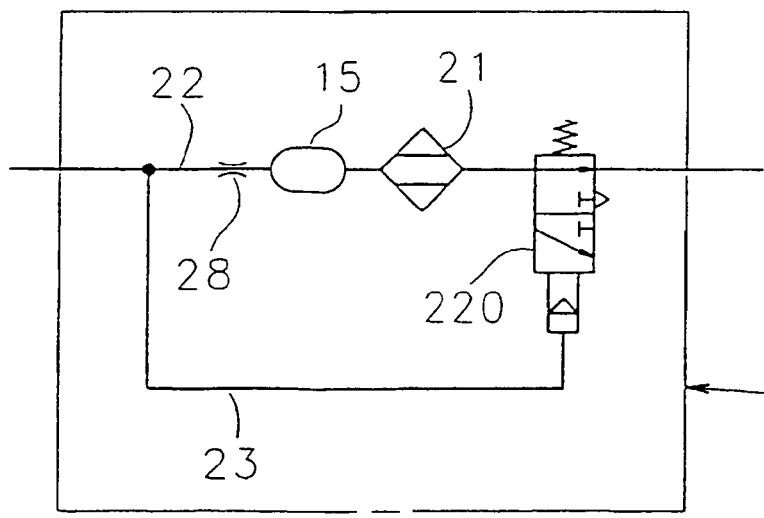

In a further embodiment of the present invention according to FIG. 8, air-discharge/dryer device (2) is equipped with a pressure-controlled valve device (220) which is disposed downstream from air dryer (21). In addition, a throttle (28) is disposed upstream from air dryer (21). Valve device (220) is designed as a 3/2-way valve, which is installed in the compressed-air line connected to the pressure outlet of air dryer (21). As a result, a simple layout of the compressed-air lines on the outlet side of air dryer (21) is achieved.

FIG. 9 illustrates a further embodiment of air-discharge/dryer device (2) that, just as depicted in FIG. 8, provides a throttle (28) disposed upstream from air dryer (21) as well as a pressure-controlled valve device (29) disposed downstream from air dryer (21). Valve device (29) is designed as a 2/2-way valve. As a result, air-discharge/dryer device (2) can be manufactured particularly inexpensively. In an advantageous practical implementation, the additional branch point of the compressed-air lines illustrated according to FIG. 9 on the outlet side of the air dryer can be integrated directly into valve device (29), and so the routing of the compressed-air lines is not more complicated than that of the configuration according to FIG. 8.

For rapid delivery of compressed air to the air-suspension bellows or from the air-suspension bellows, throttle (28) is designed in such a way as to ensure that a compressed-air flow sufficient for the desired requirements can pass through throttle (28). On the other hand, to achieve an efficient regeneration effect for the dryer granules while valve device (29) is open, the passage cross section of valve device (29, 220) is larger than the passage cross section of throttle (28), in the ratio, for example, of 4:1.

Figure 13:
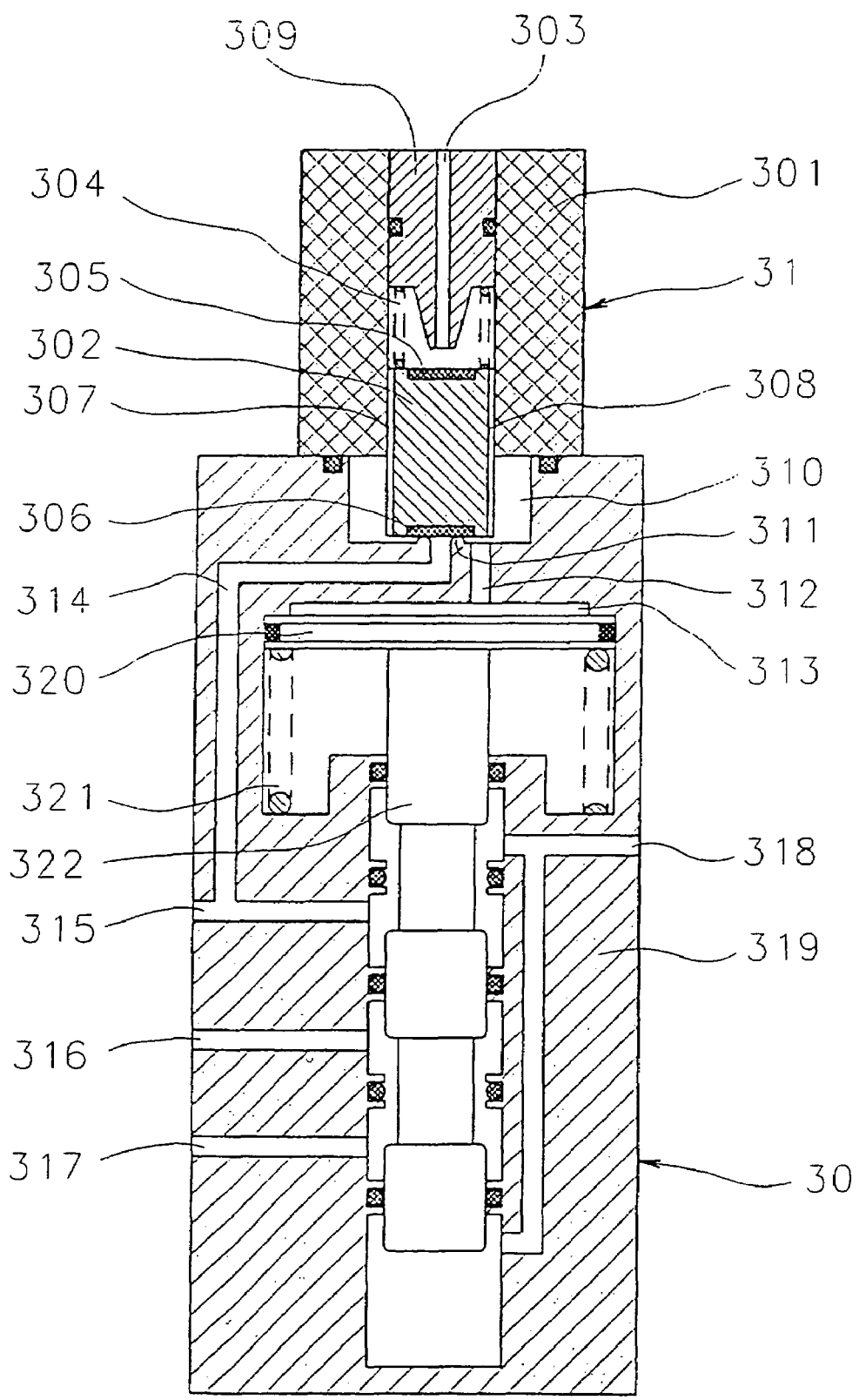
FIGS. 13 and 14 show a 4/2-way changeover-valve device in different valve positions in accordance with an embodiment of the present invention.
Figure 14:
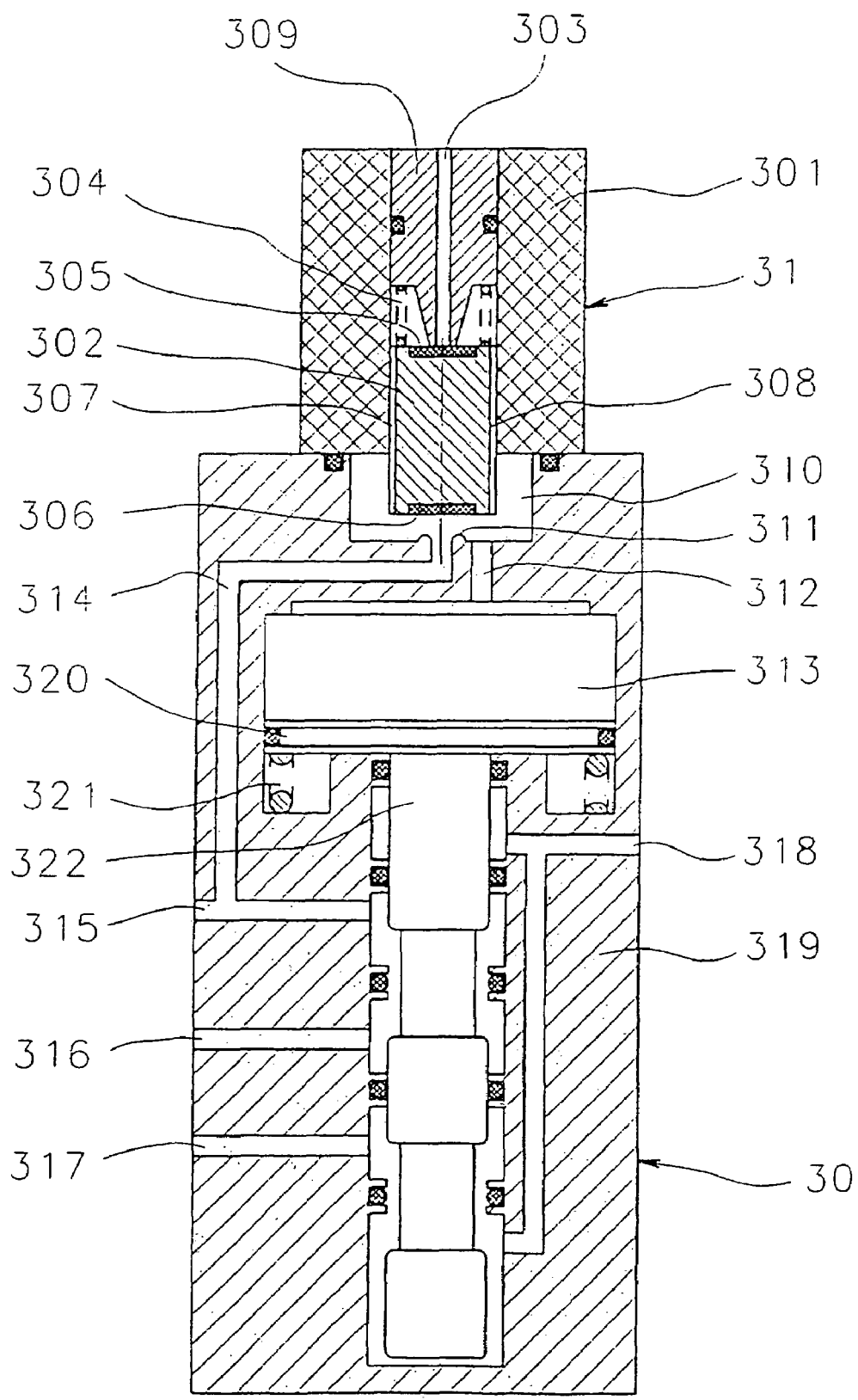

According to FIG. 1, there is proposed as changeover-valve device (3) an electromagnetically actuatable multiway-valve arrangement that is piloted by compressed air and comprises a pilot valve (31) and a changeover valve (30). Pilot valve (31) is designed as an electromagnetically actuated 3/2-way valve that can be actuated by control unit (5) via an electrical line. Changeover valve (30) is designed as a 4/2-way valve that can be actuated by compressed air and that is in communication via compressed-air ports (315, 316, 317, 318) with the other parts of the air-suspension system. Via pilot valve (31), the compressed-air-actuatable control input of changeover valve (30) can be placed optionally in communication with the pressure discharged by compressed-air delivery device (1) via air-discharge/dryer device (2) and check valve (50), or with the atmosphere. To avoid undesirably high air consumption during actuation of changeover valve (30), the control volume of this valve is kept small. FIGS. 13 and 14 show a practical example of a changeover valve designed in this way having small control volume. Furthermore, it is advantageous to keep the changeover frequency low by suitable control algorithms in control unit (5), in order to minimize the air consumption.

Compared with a 4/2-way changeover valve controlled directly by an electromagnet, valve arrangement (3) with pilot valve as illustrated in FIG. 1 has the advantage that the actuating forces that are applied by the electromagnet are smaller. As a result, the electromagnet can be of smaller and less expensive design. The fact that the pilot pressure is drawn from the compressed-air outlet branch of compressed-air delivery device (1) has the advantage that changeover-valve device (3) is functional in every operating condition of the air-suspension system. For example, it is functional even during initial startup, while compressed-air accumulator (9) is still empty.

FIG. 10 illustrates an alternative construction of changeover-valve device (3) comprising a changeover valve (30) designed as a slide valve that can be actuated by an electric motor plus an electric motor (32) that can be activated by control unit (5) in order to bring about actuation.

A further alternative embodiment of changeover-valve device (3) is illustrated in FIG. 11. Instead of a single changeover valve with 4/2-way function, as explained on the basis of FIGS. 1 and 10, a combination of two pressure-controlled 3/2-way valves (33, 34), which can be actuated by pilot valve (31), can be utilized. As regards its compressed-air port sides (35, 36), changeover-valve device (3) illustrated in FIG. 11 can be integrated as desired into the air-suspension system according to FIG. 1. In other words, it is possible, for example, to place port side (35) in communication with the compressed-air delivery device and port side (36) in communication with the compressed-air accumulator or with the air-suspension bellows. Conversely, port side (36) can also be placed in communication with the compressed-air delivery device, in which case port side (35) is placed in communication with the compressed-air accumulator and the air-suspension bellows.

Figure 12:
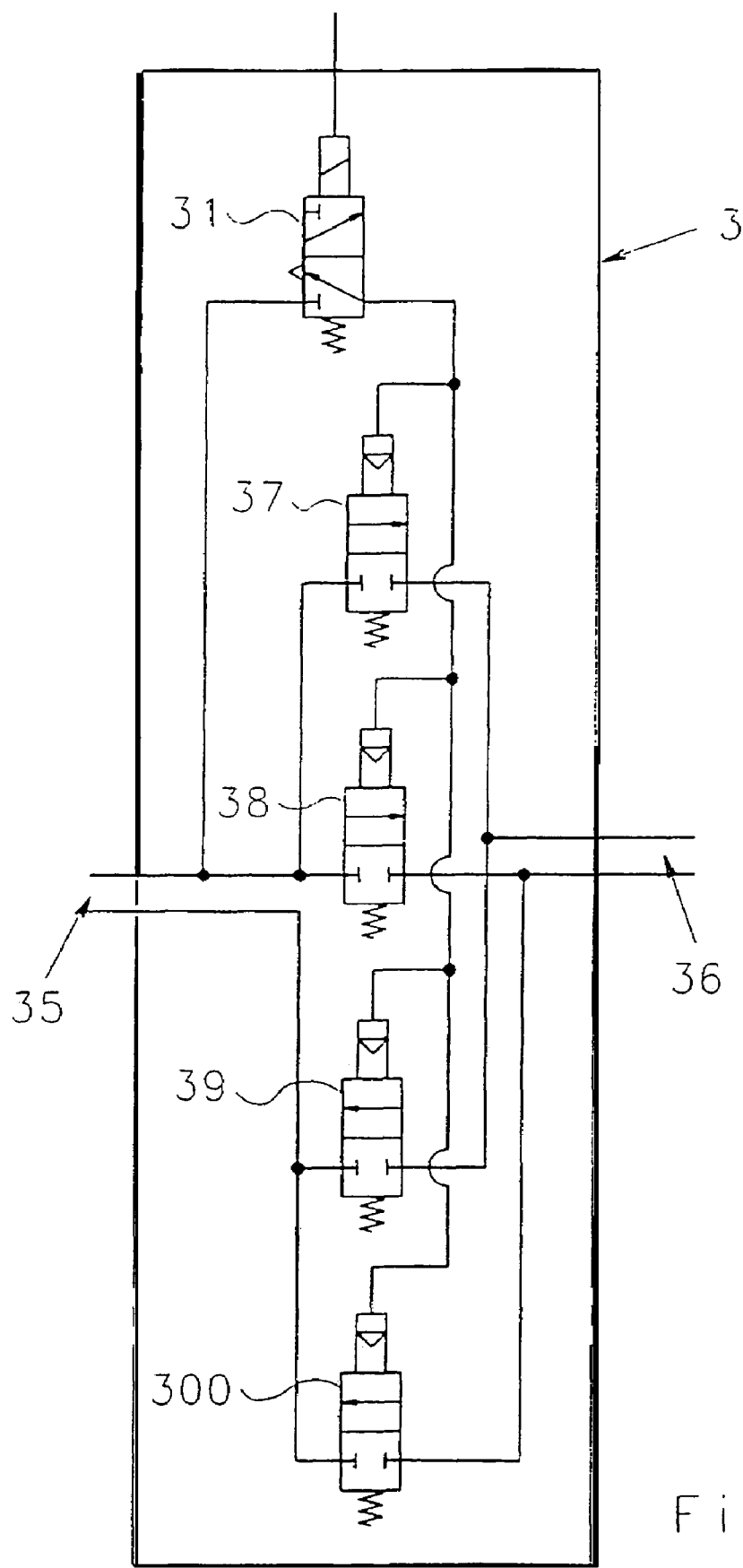

A further embodiment of changeover-valve device (3) is indicated in FIG. 12. Four pneumatically actuatable 2/2-way valves (37, 38, 39, 300), which can be actuated by pilot valve (31), are used for changeover. As explained on the basis of FIG. 11, the port sides (35, 36) of changeover-valve device (3) can also be connected as desired into the air-suspension system according to FIG. 1.

An advantageously designed configuration of changeover-valve device (3) illustrated in FIG. 1 will be hereinafter described on the basis of FIGS. 13 and 14. FIG. 13 shows changeover-valve device (3) in unactuated condition, and FIG. 14 shows it in actuated condition.

Changeover-valve device (3) comprises pilot valve (31) and changeover valve (30). Pilot valve (31) is provided with an electromagnet arrangement (301, 302), which is designed as electrical coil (301) and an armature (302), which is disposed inside coil (301) and can be moved in longitudinal direction of coil (301). Armature (302) simultaneously functions as the valve-closing member. For application as the valve-closing member, the armature is equipped at one of its end faces with a seal (305) made of an elastomer and at its opposite end face with a further seal (306), also made of an elastomer. On its circumference, armature (302) is provided with grooves (307, 308) running in longitudinal direction and functioning as air-guide ducts. Armature (302) is braced on a spring (304), which is disposed inside coil (301). Spring (304) in turn is braced on a valve closure element (309), which closes off pilot valve (31) at its upper end. Valve closure element (309) is equipped with a bore running along its longitudinal axis and functioning as pressure-outlet duct (303) for venting, to the atmosphere, the compressed air that can be injected by pilot valve (31) into changeover valve (30).

Pilot valve (31) is joined to changeover valve (30) to form a rigid unit. In the unactuated condition, as illustrated in FIG. 13, armature (302) is pressed by the force of spring (304) onto a valve seat (311) provided in changeover valve (30). In the process, seal (306) closes off valve seat (311). In this condition, seal (305) is not in contact with valve closure element (309), and so pressure outlet duct (303) is open.

Changeover valve (30) comprises a valve housing (319), which is provided with various compressed-air ports (315, 316, 317, 318) as well as air-guide ducts (314, 312). Compressed-air port (315) functions as the port to the outlet side of compressed-air delivery device (1). In other words, on the basis of the diagram of FIG. 1, it functions as the port to the outlet sides of check valves (50, 52). Compressed-air port (317) functions as the port to the intake side of compressed-air delivery device (1). That is, according to FIG. 1, it functions as the port to the inlet sides of check valves (51, 52). Compressed-air port (318) functions as the port of compressed-air accumulator (9) via accumulator valve (8). Compressed-air port (316) functions as the port of air-suspension bellows (64, 65, 66, 67) via bellows valves (60, 61, 62, 63).

Compressed air to be used for pilot action can flow via compressed-air duct (314) to pilot valve (31) or to armature (302). During actuation of pilot valve (31), electric current is applied to move armature (302) against the force of spring (304) into the position illustrated in FIG. 14. Thereupon valve seat (311) is released, allowing compressed air to flow via chamber (310) and via compressed-air duct (312) into a pilot chamber (313). Pilot chamber (313) is bounded by a longitudinally movable piston (320), which is urged by compressed air present in pilot chamber (313). Piston (320) is braced via a spring (321) against an opposing stop in valve housing (319). When appropriate compressed air is admitted into chamber (313), piston (320) is moved against the force of spring (321) into the position illustrated in FIG. 14. In the process, a valve slide (322) joined rigidly to piston (320) is moved therewith into the position illustrated in FIG. 14.

Via valve slide (322), compressed-air ports (315, 316, 317, 318) are placed in communication with one another in the way already explained on the basis of FIG. 1. Thus, in the unactuated position of changeover-valve device (3) illustrated in FIG. 13, compressed-air port (315) is in communication with compressed-air port (318), and compressed-air port (316) is in communication with compressed-air port (317). In the actuated case according to FIG. 14, compressed-air port (315) is in communication with compressed-air port (316), and compressed-air port (317) is in communication with compressed-air port (318).

Air-intake device (4) is provided as a further functional unit in FIG. 1. It is provided with an air-intake port (42) in communication with the atmosphere, with a filter (41) for filtering out impurities of the ambient air and with a check valve (40). This type of embodiment of air-intake device (4) has the advantage that, in the event of a corresponding air demand on the intake side of compressed-air delivery device (1), for example in the event that the pressure in compressed-air accumulator (9) is too low or that valves (8, 60, 61, 62, 63) are shut off during regeneration of the dryer granules, air is automatically and adequately sucked in from the atmosphere, since check valve (40) does not need any special control.

The air-suspension system described hereinabove can be operated in a number of modes of operation, which will be described in greater detail hereinafter. In the process, a number of synergy effects, by which the air-suspension system can be used particularly efficiently, are obtained in the air-suspension system illustrated in FIG. 1 as well as in the configurations according to FIGS. 2 to 14 described hereinabove.

The following modes of operation of the air-suspension system will be described hereinafter:

1. "Neutral condition": Referring to a basic condition of the air-suspension system, in which no compressed-air delivery or compressed-air movement takes place between the individual components of the air-suspension system; this condition is active in particular in the valve positions of the valves illustrated in FIG. 1 as well as when electric motor (6) is turned off.

2. "Increase": Referring to an increase of the compressed-air quantity in one or more air-suspension bellows (64, 65, 66, 67).

3. "Decrease": Referring to a decrease of the compressed-air quantity in one or more air-suspension bellows (64, 65, 66, 67).

4. "Low-pressure compensation": Referring to compensation, by intake of air from the atmosphere, for too-low air pressure or too-small compressed-air quantity, for example in compressed-air accumulator (9).

5. "Overpressure compensation": Referring to compensation, by venting to the atmosphere, for too-high air pressure or too-large compressed-air quantity in the air-suspension system, for example in compressed-air accumulator (9).

6. "Regeneration": Referring to regeneration of air dryer (21), or in other words removal of moisture stored in the dryer granules of air dryer (21), for which purpose air stored in the air-suspension system or sucked in from the atmosphere is vented through air dryer (21) to the atmosphere.

7. "Starting help": Referring to assistance, by boosting with compressed air, for startup of compressed-air delivery device (1) or its electric motor (6) used as the drive.

During the first startup of the air-suspension system according to FIG. 1, and starting from the neutral condition, compressed-air accumulator (9) as well as air-suspension bellows (64, 65, 66, 67) are for the time being at a pressure level that corresponds to atmospheric pressure. A compressed-air quantity adequate for the air-suspension system to function as designed is therefore not yet present in this condition. Control unit (5) recognizes this by evaluating the displacement information supplied by displacement sensors (68, 69, 70, 71). If pressure sensor (7) is also provided, control unit (5) additionally refers to the pressure information supplied by pressure sensor (7) to recognize the inadequate air quantity. In this condition, control unit (5) first activates the "Low-pressure compensation" mode of operation of the air-suspension system.

For this purpose, changeover-valve device (3) is used to establish communication between outlet port (106) of compressed-air delivery device (1) and air-suspension bellows (64, 65, 66, 67). As a result, compressed-air accumulator (9) is simultaneously placed in communication with the intake side of compressed-air delivery device (1). In addition, accumulator valve (8) and bellows valves (60, 61, 62, 63) are switched to open position. Electric motor (6) is then turned on, whereupon compressed-air delivery device (1) begins to deliver compressed air. Since no notable air quantity can be sucked in from the branch—in communication with compressed-air accumulator (9)—of the compressed-air line on the intake side of compressed-air delivery device (1), a reduced pressure relative to atmospheric pressure then develops on the intake side, causing check valve (40) to open. As a result, compressed-air delivery device (1) is able to suck in air from the atmosphere via air intake device (4). The sucked-in air is discharged on the outlet side of compressed-air delivery device (1), where it flows via air-discharge/dryer device (2), check valve (50), changeover-valve device (3) and bellows valves (60, 61, 62, 63) into air-suspension bellows (64, 65, 66, 67).

In the process, the resulting level height is monitored via displacement sensors (68, 69, 70, 71) by control unit (5). When a desired level height is reached at one of air-suspension bellows (64, 65, 66, 67), control unit (5) switches the bellows valve (60, 61, 62, 63) upstream from that air-suspension bellows into shut-off position. When all bellows valves (60, 61, 62, 63) have been switched to shut-off position in this way, control unit (5) turns electric motor (6) off and switches accumulator valve (8) into shut-off position; and the process of filling of air-suspension bellows (64, 65, 66, 67) is complete.

Besides filling of air-suspension bellows (64, 65, 66, 67), it may be appropriate, during startup of the air-suspension system, also to fill compressed-air accumulator (9), which initially is at atmospheric pressure. For this purpose, communication between outlet port (106) of compressed-air delivery device (1) and compressed-air accumulator (9) is established by means of changeover-valve device (3). Accumulator valve (8) is switched into open position while bellows valves (60, 61, 62, 63) are left in shut-off position. Electric motor (6) is then turned on, whereupon compressed-air delivery device (1) begins to deliver compressed air. Compressed-air delivery device (1) then sucks in air from the atmosphere through air-intake device (4). The sucked-in air is discharged on the outlet side of compressed-air delivery device (1), where it flows via air-discharge/dryer device (2), check valve (50), changeover-valve device (3) and accumulator valve (8) into compressed-air accumulator (9).

This process of filling compressed-air accumulator (9) can take place under time control, for example. That is, electric motor (6) is turned on for a predetermined filling-time interval. If pressure sensor (7) is provided, the resulting pressure level is monitored via pressure sensor (7) by control unit (5). After the predetermined filling-time interval has elapsed, or when a desired pressure value has been reached, control unit (5) turns electric motor (6) off once again and also switches accumulator valve (8) to shut-off position; and the process of filling compressed-air accumulator (9) is complete.

The process of filling explained above, that is, the "Low-pressure compensation" mode of operation, is also activated automatically by control unit (5) in subsequent operation of the air-suspension system if an insufficient air quantity in the air-suspension system is suspected on the basis of the signals of sensors (7, 68, 69, 70, 71).

In subsequent operation, that is after compressed-air accumulator (9) and air-suspension bellows (64, 65, 66, 67) have been filled for the first time, the low-pressure condition described above may develop, for example due to leaks in parts of the air-suspension system or even due to operation of the air-suspension system under altered climatic conditions, such as lower ambient temperatures. Thus, it is necessary, for example, to refill compressed air into a compressed-air accumulator (9) that had been filled to a desired nominal pressure at high ambient temperature if the vehicle equipped with the air-suspension system is being operated in a region with cooler ambient temperatures. Control unit (5) automatically recognizes such a low-pressure condition by regular evaluation of the signals of sensors (7, 68, 69, 70, 71), and in such a case automatically activates the "Low-pressure compensation" mode of operation.

In the case of a vehicle that was originally operated in a cooler climatic region, it may be that the air quantity in the air-suspension system is too large for operation in a hotter climatic region. As a result, the pressure in compressed-air accumulator (9) will be above a desired or permissible limit value. In such a case, the "Overpressure compensation" mode of operation is activated.

For this purpose, control unit (5), by means of changeover-valve device (3), places compressed-air accumulator (9) in communication with the intake side of compressed-air delivery device (1). To dissipate the overpressure, accumulator valve (8) can now be opened to pass compressed air from compressed-air accumulator (9) via accumulator valve (8), changeover-valve device (3), check valve (51) and compressed-air delivery device (1) to air-discharge/dryer device (2). By virtue of check valve (40), the compressed air cannot escape via air-intake device (4) under these conditions, but instead it flows through check valves (11, 13), which open automatically in flow direction, and through compressed-air delivery device (1) without the need for electric motor (6) to be turned on. In air-discharge/dryer device (2), the arriving overpressure causes valve (20) to change over to its third valve position, thus allowing the compressed air to flow further through valve (20), compressed-air line (24), air dryer (21), compressed-air line (25) and again through valve (20) and vent port (215) into the atmosphere. In this condition, no air flows via check valve (50), since bellows valves (60, 61, 62, 63), which in this operating condition are in communication with check valve (50) via changeover-valve device (3), are all in shut-off position.

The "Overpressure compensation" condition can be maintained, for example, until the overpressure has been sufficiently dissipated that valve (20) automatically returns to its second valve position. In this case the overpressure is controlled and limited by suitable coordination of the compressed-air actuation of valve (20) and restoring spring (208), or in other words by appropriate choice of the active area of piston (205) and of the force of spring (208).

As is evident from the foregoing, a suitable pressure range can be adjusted and maintained in the air-suspension system quasi-automatically even without use of pressure sensor (7), since on the one hand check valve (40) automatically opens at corresponding low pressure and thus enables intake of air from the atmosphere, and on the other hand valve (20) automatically opens at corresponding overpressure and permits the excess air to flow out into the atmosphere.

The air-suspension system is therefore functional even without pressure sensor (7). Thus, for cost reasons, for example, it is possible to manage without this pressure sensor. Nevertheless, if a pressure sensor (7) is provided, a further advantage is achieved in that the air-suspension system is able to continue operating safely even in the event of a defect or failure of pressure sensor (7).

In an air-suspension system without pressure sensor (7), for example, inadmissible overpressure in compressed-air accumulator (9) can be reliably prevented by placing compressed-air accumulator (9) in communication with valve (20), which functions as the overpressure safeguard, at regular time intervals, such as every 30 minutes.

If pressure sensor (7) is used, it is possible to implement further control algorithms, which can be provided as the control program in control unit (5) and by which further advantages can be achieved in control of the air-suspension system.

When pressure sensor (7) is present, control unit (5), in an advantageous configuration of the invention, performs regular monitoring of the pressure in compressed-air accumulator (9). For this purpose, control unit (5) places compressed-air accumulator (9) in communication with pressure sensor (7) by actuating accumulator valve (8) and changeover-valve device (3). In the process, compressed air is prevented by check valves (50, 52) from propagating undesirably from compressed-air accumulator (9) into other branches of the air-suspension system. If control unit (5) detects, during such a regular check, that the pressure in compressed-air accumulator (9) has exceeded a desired limit value, control unit (5) activates the "Overpressure compensation" mode of operation.

In addition, it is advantageous to provide control unit (5) with the ability to check and set the air pressure to be limited. For this purpose, control unit (5) interrupts the previously described overpressure venting via valve (20) at predetermined time intervals by toggling changeover-valve device (3) in such a way that communication is again established between pressure sensor (7) and compressed-air accumulator (9), so that the residual air pressure in the compressed-air accumulator can be measured. If a limit value stored in control unit (5) is exceeded by the measured pressure value, control unit (5) then toggles changeover-valve device (3) once again, so that further overpressure dissipation can take place via valve (20). Otherwise, control unit (5) deactivates the "Overpressure compensation" mode of operation and reactivates the "Neutral condition" mode of operation.

In another advantageous embodiment of the present invention, control unit (5) additionally tests the pressure values present in air-suspension bellows (64, 65, 66, 67) at certain time intervals by placing one of the air-suspension bellows (64, 65, 66, 67) in communication with pressure sensor (7) by appropriate control of changeover-valve device (3) and of shutoff valves (8, 60, 61, 62, 63). The measured pressure values of air-suspension bellows (64, 65, 66, 67) and of compressed-air accumulator (9) are stored in control unit (5).

If considerable differences develop between the pressure level in compressed-air accumulator (9) on the one hand and the pressure levels in air-suspension bellows (64, 65, 66, 67) on the other hand, they can be detected by control unit (5) on the basis of the stored pressure values, and so suitable corrective actions can be initiated. For example, a large pressure difference between compressed-air accumulator (9) and air-suspension bellows (64, 65, 66, 67) during delivery from the low to the high pressure level would lead to a relatively long On time of compressed-air delivery device (1). In an advantageous configuration, the On time can be shortened by programming control unit (5) in such a way that the pressure difference is limited to a predetermined value.

If the pressure level of compressed-air accumulator (9) were to exceed that of air-suspension bellows (64, 65, 66, 67) by more than the predetermined value, control unit (5) switches the air-suspension system into the "Overpressure compensation" mode of operation. At the same time, control unit (5) additionally turns on electric motor (6) in order to operate compressed-air delivery device (1) for a predetermined time. As a result, a specified quantity of air is pumped via valve (20) into the atmosphere. After the predetermined time has elapsed, control unit (5) turns compressed-air delivery device (1) off once again and then rechecks the pressure present in compressed-air accumulator (9).

Conversely, if the pressure level of compressed-air accumulator (9) is below that of air-suspension bellows (64, 65, 66, 67) by more than the predetermined value, control unit (5) switches the air-suspension system into the "Low-pressure compensation" mode of operation. As a result, air is sucked in from the atmosphere via air-intake device (4) and pumped into compressed-air accumulator (9). When a desired pressure value has been reached, control unit (5) switches the air-suspension system back to the "Neutral condition" mode of operation.

During the further operation of the air-suspension system, control unit (5) checks, on the basis of the signals of displacement sensors (68, 69, 70, 71), whether the level height of the vehicle body relative to the vehicle wheels or roadway corresponds to a desired index value. This index value can be selected automatically by control unit (5) from a plurality of predetermined index values or index-value functions, for example as a function of the driving situation. A predetermined index value can also be provided by manual intervention, for example by the driver. If a value below the respective index value is determined for one or more of the signals of displacement sensors (68, 69, 70, 71), it indicates a need for the vehicle body to be raised at the corresponding air-suspension bellows. Thus, the corresponding air-suspension bellows are filled with additional compressed air. Hereinafter it will be assumed that this is necessary for air-suspension bellows (64).

Control unit (5) then activates the "Increase" mode of operation of the air-suspension system. In the process, compressed-air accumulator (9) is placed in communication with changeover-valve device (3) by switching accumulator valve (8) to open position. Changeover-valve device (3) is switched in such a way that compressed-air accumulator (9) is placed in communication with the intake side of compressed-air delivery device (1). As a result, the outlet side of compressed-air delivery device (1) is simultaneously placed in communication with bellows valves (60, 61, 62, 63). Furthermore, control unit (5) switches bellows valve (60) to open position. If the pressure level in compressed-air accumulator (9) is higher than in air-suspension bellows (64), the compressed air already flows directly via check valve (52) and additionally through compressed-air delivery device (1) into air-suspension bellows (64) even if compressed-air delivery device (I) is stationary. In other words, by means of check valve (52), compressed-air delivery device (1) can be circumvented in the manner of a bypass. By virtue of the direct communication via check valve (52), the flow resistance achieved is smaller and thus more favorable. In the process, control unit (5) monitors the filling of air-suspension bellows (64) on the basis of the pressure signal transmitted by pressure sensor (7), if it is present, and of the displacement signal transmitted by displacement sensor (68). As soon as the desired index value of level height has been reached at air-suspension bellows (64), control unit (5) switches accumulator valve (8) and bellows valve (60) to shut-off position.

To accelerate the flow process, or if control unit (5) does not detect any change in the value measured by displacement sensor (68), control unit (5) turns on electric motor (6) to boost the delivery of air, whereby compressed-air delivery device (1) begins to operate. This is necessary in particular if the pressure in compressed-air accumulator (9) is lower than or at best equal to the pressure in air-suspension bellows (64) to be filled, or if filling of the air-suspension bellows is to be accelerated. When compressed-air delivery device (1) begins to operate, the delivered air flows via check valve (51), compressed-air delivery device (1), air-discharge/dryer device (2) and check valve (50) into air-suspension bellows (64).

If the pressure on the outlet side of compressed-air delivery device (1), especially in volume (15), were to be lower than in air-suspension bellows (64) to be filled, for example at the beginning of the "Increase" mode of operation, undesired lowering of the level height at this air-suspension bellows (64) due to pressure equalization between air-suspension bellows (64) and volume (15) is prevented by check valve (50). For this purpose, check valve (50) is advantageously disposed as closely as possible to changeover-valve device (3), in order to minimize equalization processes via the compressed-air lines.

If, during delivery of air from compressed-air accumulator (9) by compressed-air delivery device (1), it were to occur that the compressed-air quantity present in compressed-air accumulator (9) is not adequate for filling air-suspension bellows (64), which is being treated as the example, the air pressure on the intake side of compressed-air delivery device (1) would drop below atmospheric pressure, whereby check valve (40) of air intake device (4) would automatically open. As a result, compressed-air delivery device (1) can suck in the necessary air from the atmosphere automatically and without further actions by control unit (5), and thus supply the necessary air quantity in air-suspension bellows (64).

Conversely, if displacement sensor (68) indicates that the level height is above the index value, air-suspension bellows (64) is vented. Control unit (5) then activates the "Decrease" mode of operation of the air-suspension system. In the process, accumulator valve (8) and bellows valve (60) are switched to open position. Moreover, changeover-valve device (3) is switched in such a way that air-suspension bellows (64) is placed in communication with the intake side of compressed-air delivery device (1) and compressed-air accumulator (9) is placed in communication with the outlet side of compressed-air delivery device (1). If the air pressure in air-suspension bellows (64) is higher than the air pressure in compressed-air accumulator (9), compressed air flows directly via check valve (52) and additionally via compressed-air delivery device (1) from air-suspension bellows (64) into compressed-air accumulator (9). Compressed-air delivery device (1) does not have to be actuated during that process. By analogy with the "Increase" mode of operation, control unit (5) monitors the venting of air-suspension bellows (64) via sensors (7, 68). When the desired level height according to the index value has been reached in air-suspension bellows (64), control unit (5) ends the "Decrease" mode of operation by switching accumulator valve (8) and bellows valve (60) to shut-off position.

To accelerate the flow process, or if control unit (5) does not detect any change in the value measured by displacement sensor (68), control unit (5) turns on electric motor (6) to boost the delivery of air, whereby compressed-air delivery device (1) begins to operate. This is necessary in particular if the pressure in air-suspension bellows (64) to be emptied is lower than or at best equal to the pressure in compressed-air accumulator (9), or if emptying of the air-suspension bellows is to be accelerated. In this mode of operation, intake of air from the atmosphere via air-intake device (4) is not an option. Compressed-air delivery device (1) therefore sucks in air from air-suspension bellows (64) via bellows valve (60), changeover-valve device (3) and check valve (51), and delivers it via air-discharge/dryer device (2), check valve (50), changeover-valve device (3) and accumulator valve (8) into compressed-air accumulator (9).

If the pressure value present in compressed-air accumulator (9) is already adequate or even above a desired limit value, valve (20), which functions as the overpressure safeguard, automatically responds and switches to its third valve position, so that the compressed air delivered by compressed-air delivery device (1) is vented to the atmosphere. Independently of this automatic overpressure safeguard via valve (20), control unit (5) can also prevent further delivery of compressed air into compressed-air accumulator (9) if a predetermined pressure value—checked on the basis of the signal of pressure sensor (7)—stored in control unit (5) is reached in compressed-air accumulator (9). For this purpose, control unit (5) switches accumulator valve (8) to shut-off position. The compressed air subsequently delivered by compressed-air delivery device (1) is then vented to the atmosphere via valve (20) in response to a rapidly rising pressure at the outlet side—which is shut off from compressed-air accumulator (9)—of compressed-air delivery device (1).

If the pressure on the intake side of compressed-air delivery device (1), especially in volume (10), is higher than in air-suspension bellows (64) to be vented, for example at the beginning of the "Decrease" mode of operation, undesired raising of the level height at this air-suspension bellows (64) due to pressure equalization between air-suspension bellows (64) and volume (10) is prevented by check valve (51). For this purpose, check valve (51) is advantageously disposed as closely as possible to changeover-valve device (3), in order to minimize equalization processes via the compressed-air lines.

A typical magnitude for volume (10) in air-suspension systems for passenger cars is around 0.5 liter and for volume (15) is around 0.4 liter. By using check valves (50, 51), it is possible to avoid a complex design for minimizing the volume in compressed-air delivery device (1), in the electric motor (6) that is frequently integrated structurally into compressed-air delivery device (1), and in air-discharge/dryer device (2). Instead, the design can be selectively optimized from the viewpoint of costs.

The "Regeneration" mode of operation is used for regeneration of the dryer granules provided in air dryer (21), or in other words extraction of moisture therefrom. For this purpose, control unit (5) switches accumulator valve (8) and bellows valves (60, 61, 62, 63) to shut-off position and turns on electric motor (6) to cause compressed-air delivery device (1) to begin operating. Compressed-air delivery device (1) then sucks in air from the atmosphere via air-intake device (4) and discharges this air in compressed condition on the outlet side, the compressed air being heated compared with the ambient temperature. As soon as the air pressure, which is rising on the outlet side, reaches predetermined values in this process, valve (20) switches from the first valve position, firstly to the second valve position and finally to the third valve position. In the third valve position, the compressed air flows from compressed-air line (22) into compressed-air line (24), while being throttled by valve (20). That is, the compressed air expands to a lower pressure level than the pressure level present in compressed-air line (22). Air-discharge/dryer device (2) is preferably disposed in relatively close spatial proximity to compressed-air delivery device (1), so that the heated compressed air arrives in air dryer (21) without substantial drop of temperature. The air expanded and additionally heated in this way has relatively high moisture-absorption potential, and so the compressed air flowing from air dryer (21) into compressed-air line (25) has a relatively high moisture content. This air is then vented through valve (20) into the atmosphere. As a result, there is achieved very efficient and rapid drying of the dryer granules.

Otherwise, regeneration of the dryer granules is also performed whenever the already explained "Overpressure compensation" mode of operation is activated, or in other words whenever surplus compressed air stored in compressed-air accumulator (9), for example, is being dissipated via valve (20). In this case, intake of air from the atmosphere is not necessary.

In a preferred configuration of the invention, which can be used in particular in an air-suspension system without pressure sensor (7), the "Regeneration" mode of operation is always activated automatically by control unit (5) subsequent to one of the other modes of operation if compressed-air delivery device (1) had been in operation at the time. In this case, control unit (5) activates the "Regeneration" mode of operation in the sense of coasting down. In other words, when a preceding mode of operation such as "Increase" is ended, accumulator valve (8) and bellows valves (60, 61, 62, 63) are switched to shut-off position but electric motor (6) is not turned off immediately. Instead, it is left running for a coast-down period. As a result, compressed-air delivery device (1) continues to run and builds up an overpressure on the outlet side. The air at overpressure then escapes via valve (20) and air dryer (21), thus achieving regeneration of the dryer granules. After the predetermined coast-down period, such as, for example, 5 seconds, has elapsed, control unit (5) turns off electric motor (6), whereby the air-suspension system changes from the "Regeneration" mode of operation to the "Normal condition" mode of operation. As a result, it is ensured that the dryer granules have adequate absorption capacity for moisture at any time.

As indicated above, the compressed air always flows through air dryer (21) in the same flow direction in all modes of operation of the air-suspension system. As a result, it is possible to position check valve (50) in the compressed-air line between air-discharge/dryer device (2) and changeover-valve device (3) in such a way that check valve (50) is disposed relatively closely to changeover-valve device (3), and specifically downstream from air-discharge/dryer device (2). This has the advantage that, during the "Increase" mode of operation, undesired lowering of the level height as a result of pressure equalization between volume (15) and the air-suspension bellows can be prevented particularly effectively. On the other hand, if the air-drying concept used were to be such that, during regeneration operation, compressed-air flows through air dryer (21) in the flow direction opposite to that during delivery of compressed air by compressed-air delivery device (1), as is known from DE 199 59 556 C1, check valve (50) would have to be disposed between compressed-air delivery device (1) and air-discharge/dryer device (2) in the air-suspension system according to FIG. 1. In this case, however, check valve (50) could not prevent pressure equalization processes between the volumes present in air-discharge/dryer device (2) and the air-suspension bellows. The consequence would be that undesired lowering of the level height caused by pressure equalization can take place in the "Increase" mode of operation.

From the fact that compressed air always flows in the same flow direction through air-discharge/dryer device (2) and that consequently check valve (50) is disposed in the compressed-air line between air-discharge/dryer device (2) and changeover-valve device (3), there is derived the further advantage that, during dissipation of an overpressure in the "Overpressure compensation" mode of operation, the air cannot escape into the atmosphere without flowing through air dryer (21), since check valve (50) prevents it from doing so. As a result, all compressed air vented into the atmosphere benefits regeneration of the dryer granules.

In addition, control unit (5) can be provided with the capability, in the form, for example, of a subroutine of a control program executed in control unit (5), of switching the air-suspension system to "Regeneration" mode of operation if high moisture density is present in the air-suspension system. For this purpose there can be provided, for measuring the moisture content of the air in the air-suspension system, an additional moisture sensor that transmits a signal representative of the moisture content of the air to control unit (5).

Finally, the air-suspension system can also be operated in the "Starting help" mode of operation. This mode of operation is needed whenever the drive power that can be applied by electric motor (6) fails to cause compressor (12) to start. This can occur, for example, in the presence of relatively high backpressure on the outlet side, or in other words in outlet space (150) of compressor (12), especially if piston (17) is located at a position approximately midway between the two dead centers.

In an advantageous configuration of the present invention, which can be employed in particular for an air-suspension system without pressure sensor (7), accumulator valve (8) is first opened and changeover-valve device (3) is toggled for a brief time, or in other words is operated in each of the two valve positions. These actions take place before electric motor (6) is started. As a result, pressure equalization is established between the intake side and outlet side of compressed-air delivery device (1). Thereupon electric motor (6) is started.

In a further advantageous configuration, control unit (5) recognizes a starting-help demand by periodically monitoring the pressure values measured by means of pressure sensor (7), by evaluating the stored pressure values of compressed-air accumulator (9) and of the air-suspension bellows or by monitoring the current drawn by electric motor (6). If a starting-help demand is recognized, control unit (5), by appropriate operation of changeover-valve device (3) and of shutoff valves (8, 60, 61, 62, 63), places either compressed-air accumulator (9) or an air-suspension bellows having relatively high air pressure in communication with the intake side of compressed-air delivery device (1). As a result, piston (17) of compressor (12) is urged by pressure from its underside, thus reducing the drive power that is necessary for starting compressor (12) and that is supplied by electric motor (6). When compressor (12) has started, it is possible to switch back to the desired mode of operation of the air suspension system.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An air-suspension system for a vehicle, the system comprising at least one air-suspension bellows in communication with at least one further component of said air-suspension system via an array of valves to at least one of selectively increase and decrease a compressed-air quantity, said at least one further component including at least one volume having a first partial volume and a second partial volume, said at least one further component further including at least one air-discharge/dryer device which includes at least one air dryer and at least a part of said at least one air dryer forms at least a part of said second partial volume, and at least one check valve disposed between said array of valves and said at least one volume to prevent compressed-air flow between said at least one air-suspension bellows and said at least one volume in one flow direction, wherein said at least one check valve includes a check valve to prevent compressed-air flow from said at least one air-suspension bellows into said second partial volume.

2. The air-suspension system according to claim 1, wherein said at least one check valve is connected directly to said array of valves.

3. The air-suspension system according to claim 1, wherein said at least one check valve includes a check valve to prevent compressed-air flow from said first partial volume into said at least one air-suspension bellows.

4. The air-suspension system according to claim 1, wherein said at least one further component of said air-suspension system includes a compressed-air delivery device.

5. The air-suspension system according to claim 4, wherein said at least one volume includes a first partial volume and a second partial volume, and said first partial volume is disposed on an intake side of said compressed-air delivery device.

6. The air-suspension system according to claim 4, wherein said compressed-air delivery device includes a compressor.

7. The air-suspension system according to claim 6, wherein said at least one volume includes a first partial volume and a second partial volume, and at least a part of said compressor forms at least a part of said first partial volume.

8. The air-suspension system according to claim 7, wherein said at least a part of said compressor is a crankcase.

9. The air-suspension system according to claim 6, wherein said at least one volume includes a first partial volume and a second partial volume, and at least a part of said compressor forms a substantial part of said first partial volume.

10. The air-suspension system according to claim 9, wherein said at least a part of said compressor is a crankcase.

11. The air-suspension system according to claim 6, wherein said at least one volume includes a first partial volume and a second partial volume, and at least a part of said compressor forms at least a part of said second partial volume.

12. The air-suspension system according to claim 11, wherein said at least a part of said compressor is an outlet chamber.

13. The air-suspension system according to claim 4, wherein said at least one volume includes a first partial volume and a second partial volume, and said second partial volume is disposed on an outlet side of said compressed-air delivery device.

14. The air-suspension system according to claim 1, wherein at least a part of said at least one air dryer forms a substantial part of said second partial volume.

15. The air-suspension system according to claim 14, wherein said at least a part of said at least one air dryer is an air dryer cartridge.

16. The air-suspension system according to claim 1, wherein compressed air flows through said at least one air-discharge/dryer device in the same direction in all operating conditions of said air-suspension system.

17. The air-suspension system according to claim 1, wherein said at least one further component includes an air-intake device.

18. The air-suspension system according to claim 1, wherein said at least a part of said at least one air dryer is an air dryer cartridge.

* * * * *